United States Patent [19]
Fujie et al.

[11] Patent Number: 5,475,530
[45] Date of Patent: * Dec. 12, 1995

[54] OUTSIDE MIRROR FOR A VEHICLE

[75] Inventors: Naofumi Fujie, Nagoya; Koji Ito, Kariya; Taneichi Kawai, Anjo, all of Japan

[73] Assignee: Aisin Seiki Kabushiki Kaisha, Kariya, Japan

[*] Notice: The portion of the term of this patent subsequent to May 29, 2007, has been disclaimed.

[21] Appl. No.: 576,212

[22] Filed: Aug. 31, 1990

[30] Foreign Application Priority Data

| Aug. 13, 1989 | [JP] | Japan | 1-227115 |
| Aug. 31, 1989 | [JP] | Japan | 1-227113 |
| Aug. 31, 1989 | [JP] | Japan | 1-227114 |
| Sep. 3, 1989 | [JP] | Japan | 1-227116 |
| Oct. 26, 1989 | [JP] | Japan | 1-279377 |

[51] Int. Cl.$^6$ .............. B60R 1/06; G02B 7/182
[52] U.S. Cl. .............. 359/512; 359/507; 219/219
[58] Field of Search ............... 350/582, 586, 350/588, 589, 590; 219/219, 202, 505; 359/507, 512, 509

[56] References Cited

U.S. PATENT DOCUMENTS

| 3,171,683 | 3/1965 | Ludwig | 350/582 |
| 3,686,473 | 8/1972 | Shim et al. | 350/588 |
| 4,237,366 | 12/1980 | Berg | 219/219 |
| 4,410,790 | 10/1983 | Berg et al. | 350/582 |
| 4,631,391 | 12/1986 | Tiepke | 219/219 |
| 4,929,072 | 5/1990 | Fujie et al. | 350/582 |
| 5,013,888 | 5/1991 | Okada et al. | 219/219 |
| 5,155,625 | 10/1992 | Komatsu et al. | 359/507 |

FOREIGN PATENT DOCUMENTS

| 7118725 | 5/1971 | Germany. |
| 59-40145 | 3/1984 | Japan. |
| 1-113069 | 7/1989 | Japan. |

*Primary Examiner*—Paul M. Dzierzynski
*Assistant Examiner*—Thong Nguyen
*Attorney, Agent, or Firm*—Burns, Doane, Swecker & Mathis

[57] ABSTRACT

An outside mirror for a vehicle has a ultrasonic vibrator and a heating member in order to quickly remove the foreign substances from the entire surface of a mirror member. The ultrasonic vibrator is rigidly fixed to a supporting member. The supporting member is rigidly fixed to outer edges of the mirror member. A space is provided between the mirror member and the supporting member. The heating member is installed in the space. The ultrasonic vibrator atomizes water drops on the mirror member. The heating member melts ice, frost or other foreign substances on the mirror member. The ice, frost or the other foreign substances which are melted by the heating member are removed by the ultrasonic vibrator.

14 Claims, 8 Drawing Sheets

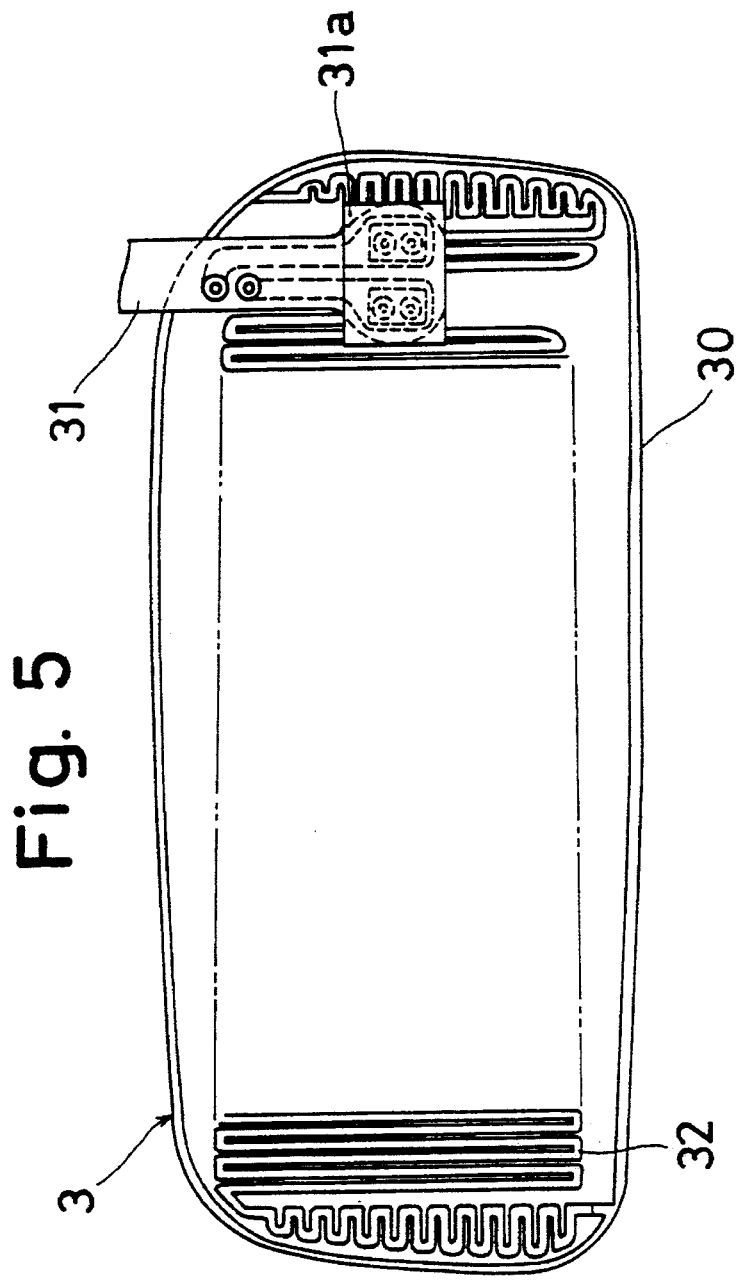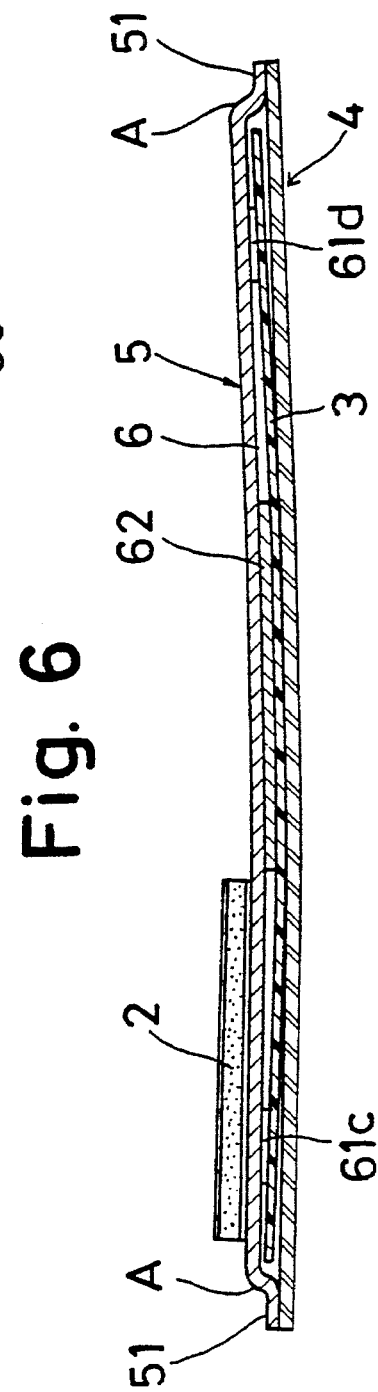

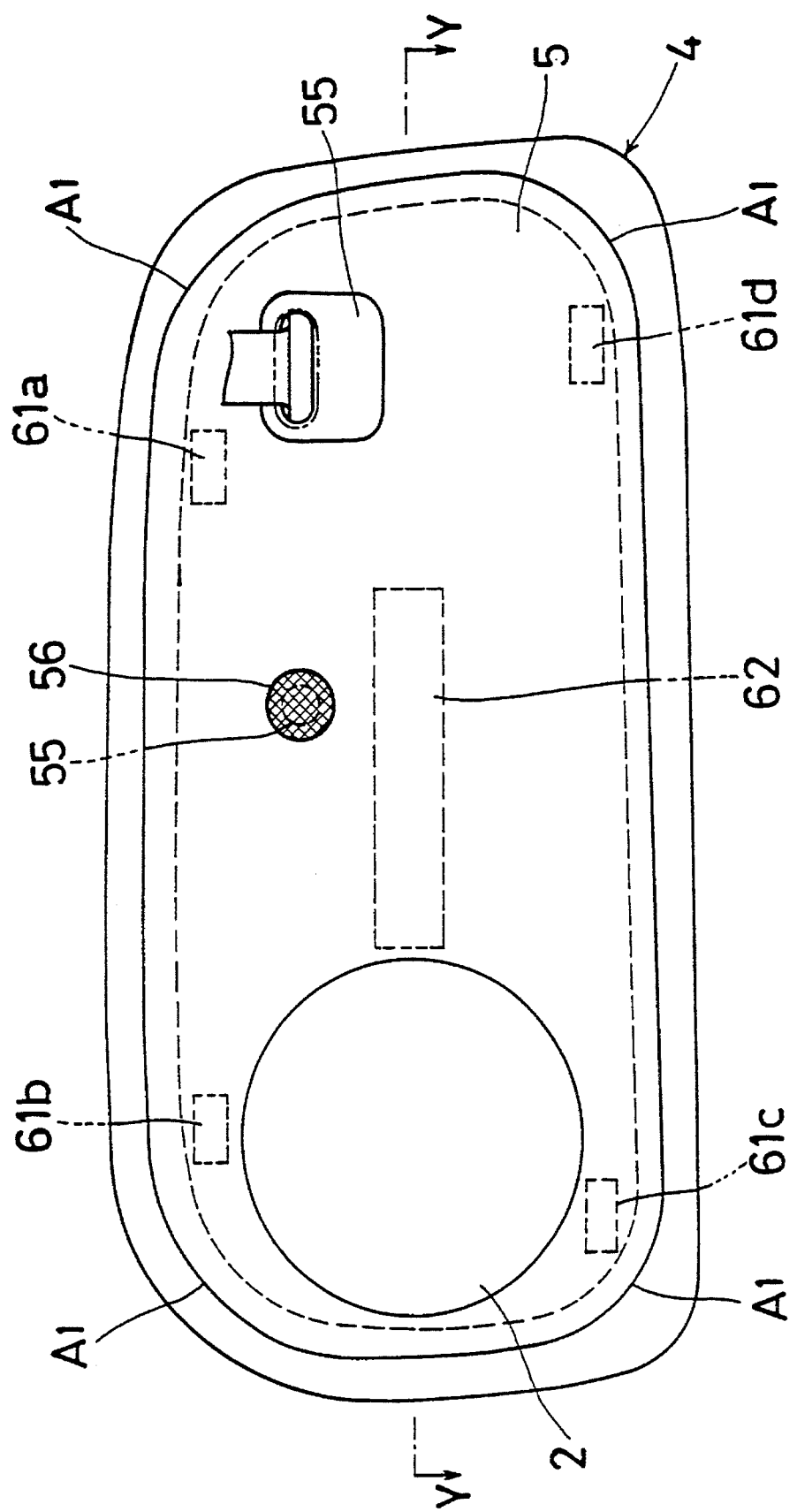

OUTSIDE MIRROR FOR A VEHICLE

BACKGROUND OF THE INVENTION

This invention relates to an outside mirror for a vehicle which maintains a clear rear view against foreign substances such as rain drops, ice or frost.

Referring now to FIG. 9, a conventional outside mirror will be explained. For example, Japanese Utility Model Laid Open Print No. 01-113069 published without examination on Jul. 28, 1989 discloses the conventional outside mirror. The outside mirror comprises a mirror member (104), a supporting member (105) fixed to the mirror member (104) by a connecting member (151), and a piezoelectric vibrator (102) fixed to the supporting member (105). The connecting member (151) provides a space between the supporting member (105) and the mirror member (104). The mirror member (104) can be resonated by oscillating the vibrator (102) and the supporting member (105). Rain drops, ice, frost, or other foreign substances can be removed from the mirror member (104) by the resonance vibration of the mirror member (104).

Further, referring now to FIG. 10, Japanese Utility Model Laid Open Print No. 59-40145 published without examination on Mar. 14, 1984 disclosed another conventional cleaning device. In this device, a heater (106) is adhered to a mirror member (104) in order to heat the mirror member (104). Electric power is supplied to the heater (106) through the terminals (107) and (108). When the mirror member (104) is heated by the heater (106), water drops on the mirror member (104) are evaporated.

"The vibrator (102) of the Japanese Publication No. 01-113069 can remove water drops relatively quickly, but it can not generate heat for melting and removing frost and ice on the mirror." On the other hand, the heater (106) of the Japanese publication No. 59-40145 can remove water drops, frost and ice, but the heater (106) requires a relatively long time to heat the mirror member (104), and thus is slow acting.

SUMMARY OF THE INVENTION

Accordingly, one of the objects of the present invention is to obviate the above conventional drawbacks.

The other object of the present invention is to quickly remove the foreign substances from the entire surface of a mirror member.

To achieve the above objects and in accordance with the principles of the invention as embodied and broadly described herein, an outside mirror for a vehicle is provided which comprises a mirror member having outer edges, a supporting member rigidly fixed to the mirror member, a space provided between the mirror member and the supporting member, a vibrator rigidly fixed to the supporting member, and, a heating member installed in the space.

BRIEF DESCRIPTION OF THE DRAWINGS

The accompanying drawings, which are incorporated in and constitute a part of the specification, illustrate embodiments of the invention, and serve to explain the principles of the invention. Of the drawings:

FIG. 5 is a rear view showing a heating member of the first embodiment of the present invention;

FIG. 6 is a cross sectional view showing a holder member, a mirror member, a supporting member, and a heating member of the second embodiment of the present invention;

FIG. 7 is a rear view showing a side mirror device having a mirror member, a supporting member, and a heating member as in the second embodiment of the present invention;

DETAILED DESCRIPTION OF THE PREFERRED EMBODIMENTS

Reference will now be made in detail to the present preferred embodiment of the invention, an example of which is illustrated in accompanying drawings.

Referring now to FIGS. 1 to 5, the first embodiment of the present invention will be explained.

Figure 3:
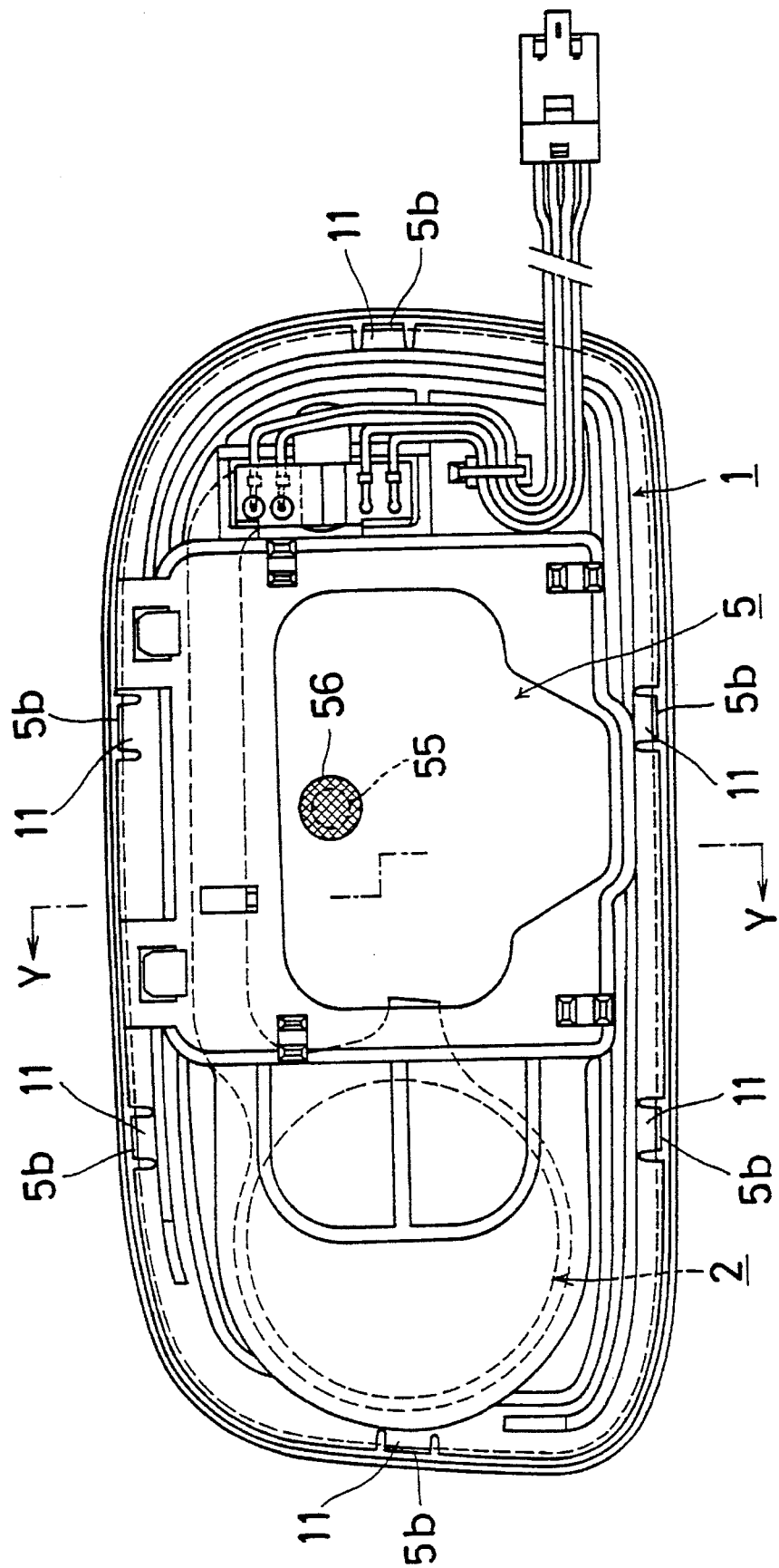
FIG. 3 is a rear view showing a holder member for accommodating a mirror member, a supporting member, and a heating member as in the first embodiment of the present invention.
Figure 4:
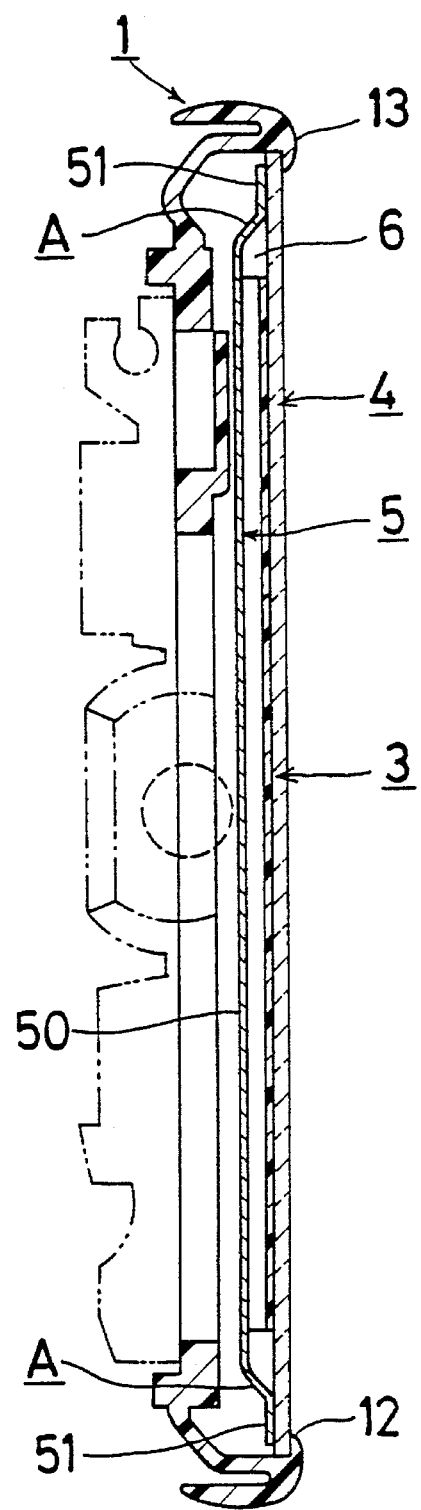
FIG. 4 is a cross sectional view showing a holder member, a mirror member, a supporting member, and a heating member as in the first embodiment of the present invention.

Shown in FIGS. 3 and 4 is a holder member (1) made from synthetic resin and formed by an injection molding. The holder member (1) has an opening (12) which is located on an incident side, and a sustaining portion (13) which surrounds the opening (12). In the holder member (1), a mirror member (4) which has a proper curvature is installed. The holder member (1) is supported by a vehicle body via a mirror housing (not shown).

The mirror member (4) includes a transparent glass and reflecting layer (not shown). The transparent glass is exposed to the outside through the opening (12)

Figure 1:
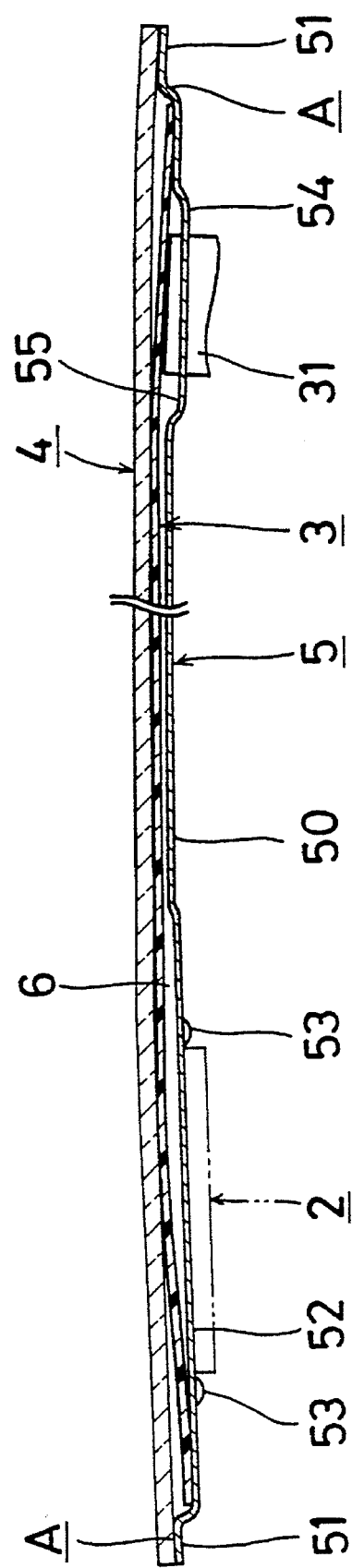
FIG. 1 is a cross sectional view showing a mirror member, a supporting member and a heating member of a first embodiment of the invention.
Figure 2:
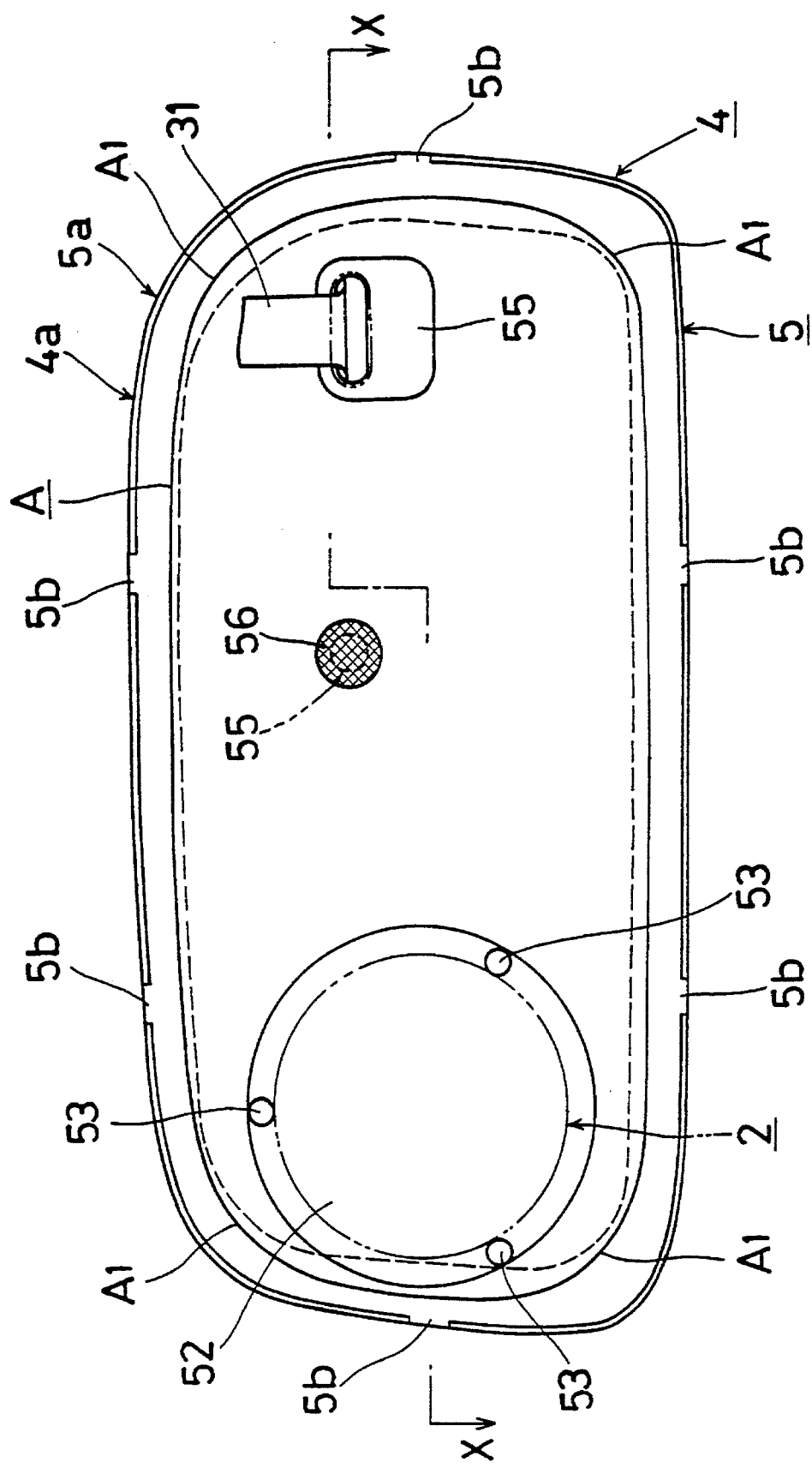
FIG. 2 is a rear view of a side mirror device having a mirror member, a supporting member, and a heating member for the first embodiment of the invention.

Showing in FIGS. 1 and 2, a supporting member (5) is disposed in parallel to the mirror member (4). There is a space (6) between the mirror member (4) and the supporting member (5). The space (6) is provided by an encircled step portion (A) of the supporting member (5). The step portion (A) encloses the space (6). As shown in FIG. 2, the curvature of the step portion (A) is larger than that of the mirror member (4) on each corner (A1). The reflection of the oscillation on each corner (A1) of the supporting member (5) is reduced due to the increase of the curvature of the step portion (A).

The supporting member (5) is a bit smaller in size than the mirror member (4) so that the adhesive which joins the mirror member (4) and the supporting member (5) is not extruded to the exposed surface of the mirror member (4). The difference in size between the outer circumference (4a) of the mirror member (4) and the outer circumference (5a) of the supporting member (5) is about 1 to 2 millimeters. The difference is established to be as small as possible so as to efficiently transfer the oscillation of the supporting member (5) to the mirror member (4).

Further, the supporting member (5) is made from a metal plate having almost the same coefficient of liner expansion as the mirror member (4). The supporting member (5) can be formed by ferritic stainless steel, martensitic stainless steel, titanic materials or other similar material. The coefficient of liner expansion of these materials is approximately $9 \times 10^{-6}$. Comparing to these metals, the coefficient of liner expansion of the transparent glass is approximately $8 \times 10^{-6}$. Thus, these materials have similar coefficients of liner expansion to the mirror member (4).

The supporting member (5) includes a plate portion (50) having almost the same curvature as the mirror member (4). The supporting member (5) also includes a connecting portion (51) which is located around the plate portion (50). The connecting portion (51) is adhered to the mirror member (4) rigidly and tightly by an adhesive. After adhering the supporting member (5) to the mirror member (4), the narrow and long space (6) is provided between the supporting member (5) and the mirror member (4). The plate portion (50) includes a flat portion (52) where the vibrator (2) is adhered. Projections (53) are provided on the flat portion (52) so as to locate the vibrator (2) on the proper portion.

The connecting portion (51) has the same curved surface as the mirror member (4) so as to distribute adhesive uniformly and thinly around the mirror member (4), and prevents distortion from being generating. Similarly, the flat portion (52) has the same flat surface as the vibrator (2) so as to distribute adhesive uniformly and thinly on the vibrator (2). The uniform and thin adhesive layer between vibrator (2) and flat portion (52) can transfer the oscillation of the supporting member (5) to the mirror member (4) efficiently.

Further, a slot (54) for extending a flexible conductor (31) is also provided on the support member (5). The flexible conductor (31) supplies electric power to a heating member (3) located between the mirror member (4) and the supporting member (5). The slot (54) is sealed tightly by sealing resin, after the flexible conductor (31) is inserted into the slot (54). The flexible conductor (31) is electrically and mechanically connected to the heating member (3) through a connection (31a). The raised portion (55) of the supporting member (5) accommodates the connection (31a) so as to keep apart the connection (31a) from the mirror member (4).

Figure 9:
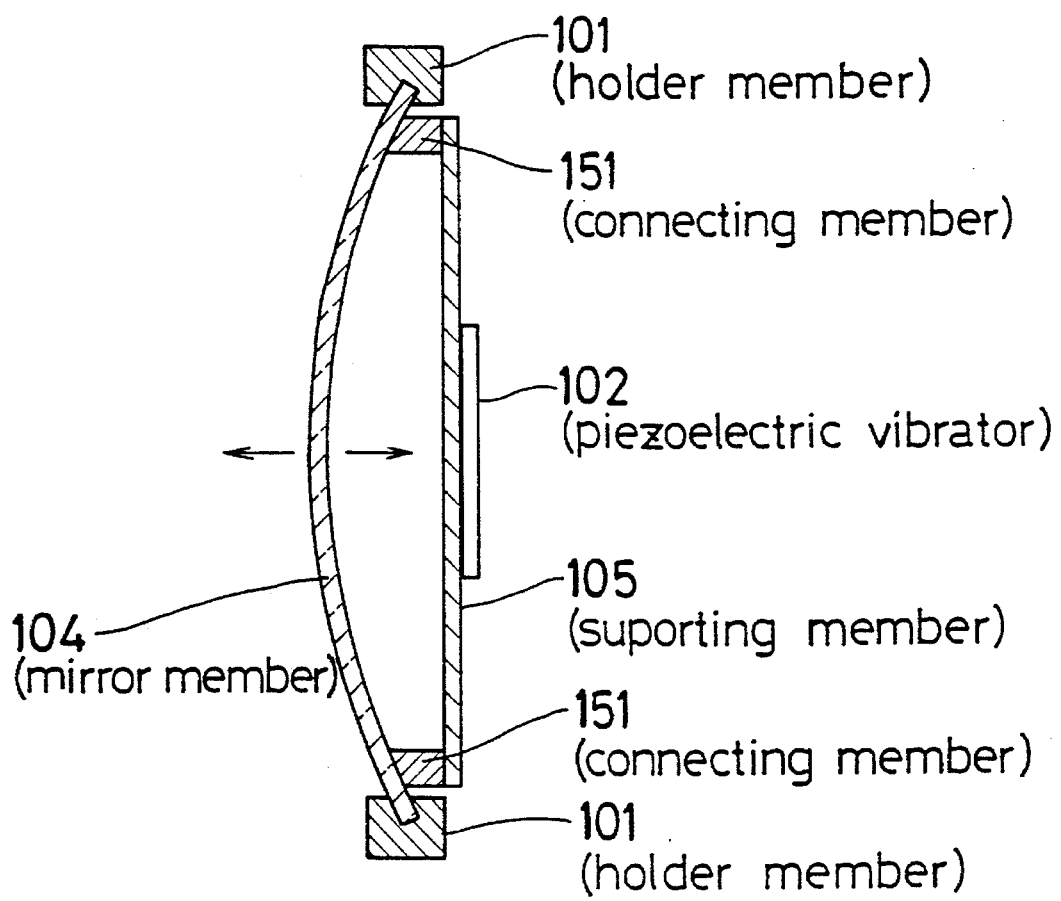
FIG. 9 is a cross sectional view of a conventional outside mirror for a vehicle.
Figure 10:
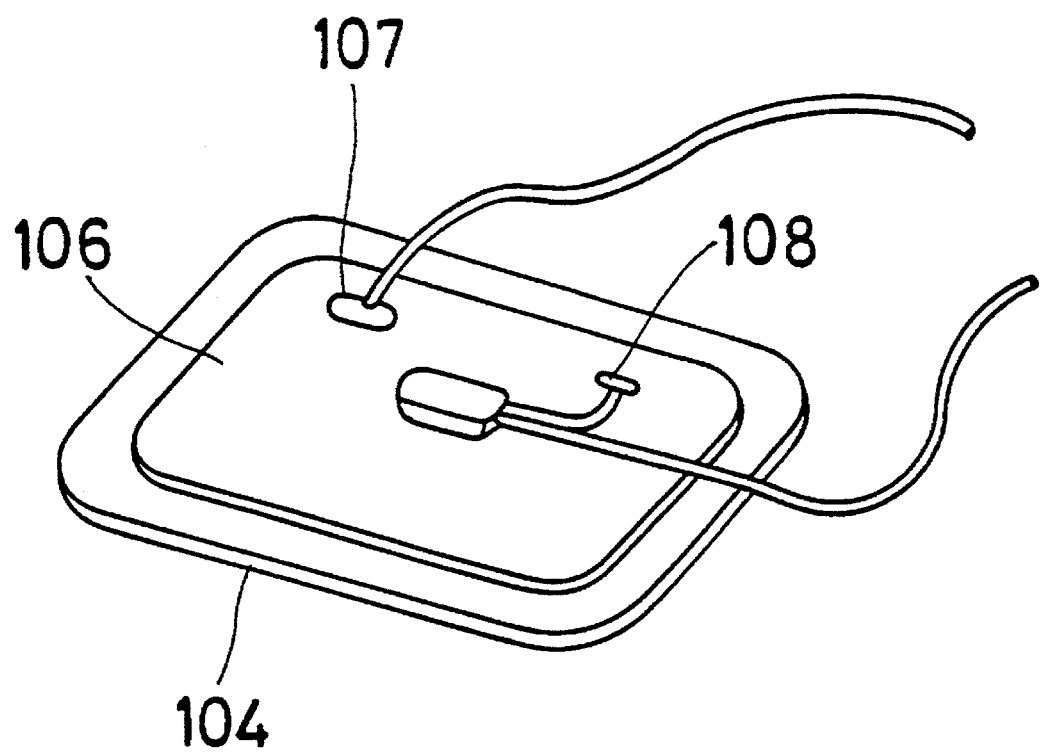
FIG. 10 is a perspective view of a conventional outside mirror for a vehicle.

Six projections (5b) are provided on the supporting member (5). These projections (5b) are pinched by the spring portion (11) of the holder member (1) (shown in FIG. 9) in order to fix the mirror member (4) and the supporting member (5) to the holder member (1).

The space (6) is closed since the supporting member (5) is adhered to the mirror member (4) and the slot (54) is sealed tightly. Therefore, water drops may be formed in the space (6) due to temperature changes. The water drops absorb the oscillation of the mirror member (4) and the supporting member (5). To avoid this absorption, in this embodiment, a small hole (55) is provided on the supporting member (5). The hole (55) is covered with a water proof cloth having good aeration. The small hole (55) communicates the space (6) with the atmosphere. If the water drops are formed in the space (6), the water drops are atomized due to the oscillation of the mirror member (4) and the supporting member (5). Then the atomized water drops are vented from the hole (55).

Shown in FIG. 5, the heating member (3) comprises a flexible base (30) and a heater pattern or a zig-zag formed resistor (32) which is covered with the flexible base (30). The resistor (32) is connected to the flexible conductor (31) which supplies the electric power to the heating member (3).

The resistor (32) is made from PTC (Positive Temperature Coefficient Thermistor). The PTC increases its resistive value according to the rising temperature until the temperature exceeds the Curie temperature. Thus, the resistor (32) changes its resistive value by itself so as to sustain a constant temperature.

Shown in the FIG. 1, the heating member (3) is adhered to the supporting member (5). The heating member (3) is bent so as to contact the center area of the heating member (3). The flexible base (30) is made from a isolating material which has low coefficient of friction.

The mirror member (4) is oscillated independently from the heating member (3) since the base (30) is very elastic and slippery on the mirror member (4). Thus, the oscillation of the mirror member (4) is not absorbed by the flexible base (30). Further, heating member (3) is oscillated entirely with the supporting member (5) and the mirror member (4). Therefore, the life of the heating member (3) can be extended since stress may be distributed to the entire heating member (3).

When electric power is supplied to the vibrator (2), the vibrator (2) expands and contracts radially. The radial expansion and contraction on the vibrator (2) generates the oscillation of the supporting member (5) and the mirror member (4). If the proper frequency is supplied to the vibrator (2), a standing wave is generated on the mirror member (4) due to resonation of the mirror member (4), the supporting member (5) and the vibrator (2). The water drops or other foreign substances are removed from the mirror member (4) due to the standing wave.

When the electric power is supplied to the heating member (3), the resistor (32) generates heat. The heat is transferred to the mirror member (4) by conduction, convection and radiation. The ice or other foreign substances on the mirror are melted due to the heat and removed by the standing wave on the mirror member (4).

The mirror member (4) and the supporting member (5) is expanded due to the heat which is generated by the heating member (3). However, in this embodiment, the coefficient of liner expansion of the support member (5) is similar to the mirror member (4). Therefore, although the support member (5) is rigidly adhered to the mirror member (4), less stress is given to the mirror member (4). Thus, the distortion of the mirror member (4) can be decreased successively. Since the mirror member (4) is not distorted, the supporting member (5) is not easily separated from the mirror member (4). Further, the tightness between the mirror member (4) and the supporting member (5) is maintained for long time. Furthermore, the mirror member (4) is difficult to be brake.

The thickness between the mirror member (4) and the supporting member (5) can be reduced since the plate portion (50) of the supporting member (5) has the same curvature as the mirror member (4). Further, the heat distribution can be made uniform in the space (6) since the space (6) has almost the same thickness. Therefore, the mirror member (4) can be heated quickly.

Referring now to FIGS. 6 and 7, the second embodiment of the present invention will be explained. In the second embodiment, a spacer (62) and four thick adhesive layers (61a, 61b, 61c, 61d) are disposed between the heating member (3) and the supporting member (5). The adhesive layers (61a, 61b, 61c, 61d) are as small as possible and are located on the outer circumference of the heating member (4) so as not to absorb the oscillation of the supporting member (5).

Further, a spacer (62) is adhered to the center of the heating member (3). The thickness of the spacer (62) is defined so as to contact the heating member (3) to the mirror member (4). The spacer (62) is preferably made from some material which does not transmit the oscillation well. The spacer (62) can be made from Butyl rubber foam or felt.

In the second embodiment, the mirror member (4) is oscillated independently from the heating member (3), since the heating member (3) is not fixed to the mirror member (4) but is only in contact with the mirror member (4). Accordingly, as in the first embodiment, the oscillation of the mirror member (4) is not absorbed by the heating member (3).

In addition, in the second embodiment, the supporting member (5) can be independently oscillated from the heating member (3), since the spacer (62) is not adhered to the supporting member (5) but is only in contact with the supporting member (5). Accordingly, the oscillation of the supporting member (5) is not absorbed by the spacer (62).

Further, the heat which is generated by the heating member (3) can be transmitted to the mirror member (4) effectively since the spacer (62) force the heating member (3) to contact the mirror member (4).

Figure 8:
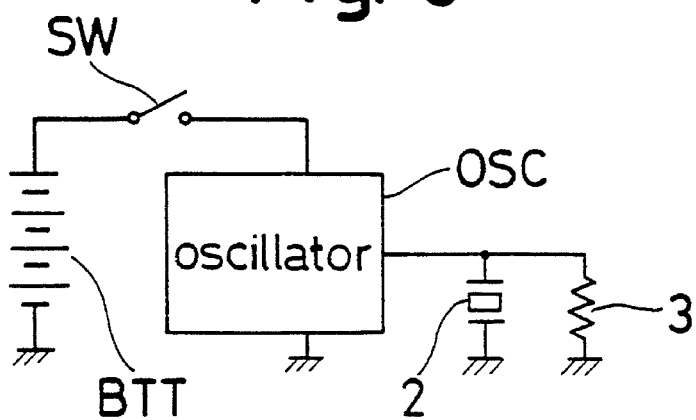
FIG. 8 is a circuit diagram of a side mirror device for both the first and second embodiments.

As showing in FIG. 8, a battery (BTT) is connected to the Oscillating circuit (OSC) through a switch (SW). While the switch (SW) is closed, electric power is supplied from the battery (BTT) to the oscillating circuit (OSC), and the oscillating circuit (OSC) starts oscillating. While the oscillating circuit (OSC) is oscillating, A.C. power is supplied to the vibrator (2) and the heating member (3), Thus, the vibrator (2) oscillates the mirror member (4), and the heating member (3) heats the mirror member (4).

Although the A.C. power is supplied to the heating member (3) in FIG. 8, D.C. power of the battery (BTT) can be directly supplied to the heating member (3). If the D.C. power is directly supplied to the heating member (3), the heating member (3) can be operated independently from the vibrator (2).

As one of ordinary skill will appreciate from the above description and drawings, there is provided an outside mirror for a vehicle which quickly and effectively removes ice, frost, or water drops from the mirror surface using a combination of a heating member and a vibrator.

Various modifications may be made in the invention without departing from the scope or spirit of the invention.

What is claimed is:

1. A mirror comprising:

a mirror member having an edge;

a second member connected to the mirror member;

a space between the mirror member and the second member;

vibrating means connected to the second member for vibrating the mirror member; and a heating means between the mirror member and the second member for heating the mirror member.

2. The mirror in claim 1, wherein the second member further includes a connecting portion tightly fixed to outer edges of the mirror member.

3. The mirror in claim 2, wherein the second member further includes a plate portion having substantially the same curvature as the mirror member.

4. The mirror in claim 3, wherein the plate portion further includes a hole which is covered with a water proof member having good aeration.

5. The mirror in claim 1, wherein the second member further includes a hole which is covered with a water proof member having good aeration.

6. The mirror in claim 1, wherein the second member is smaller than the mirror member.

7. The mirror in claim 1, wherein the second member further includes an encircled step portion, and the curvature of the encircled step portion on each corner is larger than that of the mirror member.

8. The mirror in claim 1, wherein the second member is made from a material having a similar coefficient of linear expansion to the mirror member.

9. The mirror in claim 1, wherein the heating means is fixed to the second member.

10. The mirror in claim 9, wherein the heating means is bent so that a center area of the heating means contacts the mirror member.

11. The mirror in claim 9, wherein the heating means includes a positive temperature coefficient thermistor.

12. The mirror in claim 1, wherein the heating means is held in contact with the mirror member by a spacer.

13. The mirror in claim 12, wherein the spacer is fixed to the center of the heating means.

14. The mirror in claim 12, wherein the spacer is made from a material which does not transmit oscillations from the vibrating means to the heating means.

* * * * *

UNITED STATES PATENT AND TRADEMARK OFFICE
CERTIFICATE OF CORRECTION

PATENT NO. : 5,475,530
DATED : December 12, 1995
INVENTOR(S) : Naofumi FUJIE et al It is certified that error appears in the above-indentified patent and that said Letters Patent is hereby corrected as shown below:

Title page, item [30], delete "Aug. 13, 1989" and insert -- Aug. 31, 1989 --.

Signed and Sealed this

Twenty-seventh Day of February, 1996

Attest:

BRUCE LEHMAN

Attesting Officer        Commissioner of Patents and Trademarks